US009886740B2

(12) United States Patent
Akenine-Moller et al.

(10) Patent No.: US 9,886,740 B2
(45) Date of Patent: Feb. 6, 2018

(54) DEGRADATION COVERAGE-BASED ANTI-ALIASING

(71) Applicant: Intel Corporation, Santa Clara, CA (US)

(72) Inventors: Tomas G. Akenine-Moller, Lund (SE); Jim K. Nilsson, Lund (SE)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 14/277,223

(22) Filed: May 14, 2014

(65) Prior Publication Data

US 2015/0332436 A1    Nov. 19, 2015

(51) Int. Cl.
*G06T 5/00* (2006.01)
*G06T 1/60* (2006.01)
*G06T 15/50* (2011.01)

(52) U.S. Cl.
CPC ............... *G06T 1/60* (2013.01); *G06T 5/00* (2013.01); *G06T 15/503* (2013.01)

(58) Field of Classification Search
CPC ..... G06T 15/503; G06T 2200/12; G06T 1/60; G06T 5/00
See application file for complete search history.

(56) References Cited

U.S. PATENT DOCUMENTS

| 6,553,044 | B1* | 4/2003 | Eden | H01S 5/4031 372/34 |
| 6,809,740 | B1* | 10/2004 | Weed | H04N 1/6019 345/589 |
| 7,046,064 | B1* | 5/2006 | Runaldue | H03L 7/0814 327/237 |
| 2015/0222532 | A1* | 8/2015 | Ghobadi | H04L 67/1004 370/392 |

OTHER PUBLICATIONS

Young, P., "CSAA (Coverage Sampling Anti-Aliasing," NVIDIA, 2007 (11 pages).

* cited by examiner

*Primary Examiner* — Phi Hoang
(74) *Attorney, Agent, or Firm* — Trop Pruner & Hu, P.C.

(57) ABSTRACT

In one embodiment the table pointed to by visibility samples in Degradation Coverage-Based Anti-Aliasing is split up so that more values can fit (but each value uses fewer bits). This way, more values can be represented in a pixel, and this leads to better image quality in some embodiments. This also opens up the possibility of using as few as two values per pixel, whereas the CSAA uses four or more. Hence, this also saves bandwidth and therefore, also reduces power consumption in some embodiments.

30 Claims, 3 Drawing Sheets

DEGRADATION COVERAGE-BASED ANTI-ALIASING

BACKGROUND

This relates to graphics processing.

Aliasing is an artifact that results from undersampling of an image. It may appear as jagged lines or edges.

Anti-aliasing reduces aliasing. In three-dimensional graphics pipelines graphics are handled with very high resolution. During rendering, the color of each pixel to be displayed is determined. At this or a later stage anti-aliasing may be performed.

In sampling, a single value called a sample is chosen from a varying series of values. The more samples, the more accurately the rendering of a scene.

Coverage-Sampling Anti-Aliasing (CSAA) is an affordable high-quality anti-aliasing (AA) method, since it has more visibility samples (also called coverage samples) than color and depth samples. Per pixel, each visibility sample then "points" in to a small table of values, called a pixel's value table, where values can be colors, colors/depth pairs, colors/depths/stencil, etc. Since there are more visibility samples, the AA quality can be higher.

However, for pixels with more values than can fit in the table, some heuristic would be used to merge two values into one. Currently, it is not well known how this would be done.

BRIEF DESCRIPTION OF THE DRAWINGS

Some embodiments are described with respect to the following figures.

DETAILED DESCRIPTION

In one embodiment the pixel's value table pointed to by visibility samples in Degradation Coverage-Based Anti-Aliasing (DCAA) is split up so that more values can fit (but each value uses fewer bits). In this way, more values can be represented in a pixel, and this leads to better image quality in some embodiments.

This also opens up the possibility of using as few as two values per pixel, whereas CSAA uses four or more. Hence, this also saves bandwidth and therefore, also reduces power consumption in some embodiments. Such a scheme may fit high-resolution displays (e.g., 2 k, 3 k, and 4 k) for mobile devices, such as tablets and phones.

Using 16-32 visibility samples per pixel can generate very high quality images in some embodiments. Using only two values per pixel can generate sufficient quality for difficult pixels, and excellent quality for the most common cases, and is a very power-efficient solution in some embodiments.

Figure 1:
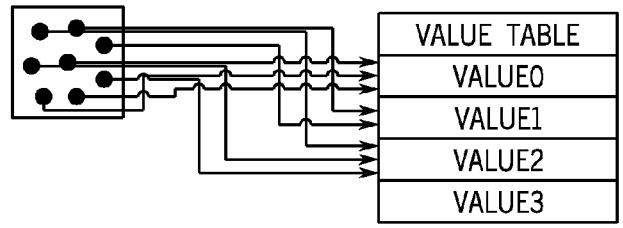
FIG. 1 is a visualization of CSAA.

CSAA can be visualized, as shown in FIG. 1, for one pixel with 8 visibility samples and 4 values (which can be colors, colors/depths, colors/depths/stencils, etc.) per pixel, where black circles are visibility samples:

As can be seen in FIG. 1, each visibility sample can point into the table of four values. Hence, two bits are required per visibility sample (VS) to point to any of the four values. Note that in this case, none of the VSs are pointing to value3.

The term "value" represents a color or color/depth, or color/depth/stencil, for example. Instead of merging two values into one, in DCAA a value is split into two lower-resolution values, and more bits per index are used to point into a value table with more values (with lower resolution). In addition, merging and splitting are mixed, depending on what is best in the current situation.

Figure 2:
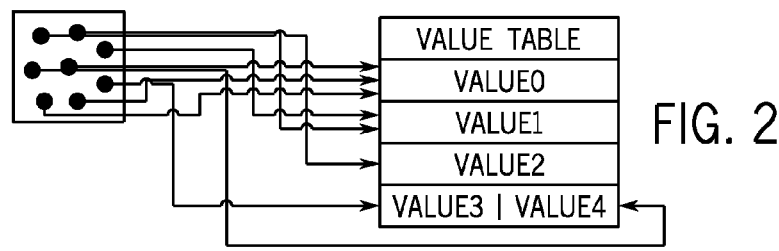
FIG. 2 is a visualization of Degradation Coverage-Based Anti-Aliasing according to one embodiment.

In one embodiment, illustrated in FIG. 2, the value3 has been split up into a smaller (i.e., using fewer bits) value3 and a smaller value4. This pixel can now reference five colors, etc. instead of four, which is an advantage of some embodiments.

This scheme can be used in different ways. First, it can use fewer values per pixel in some embodiments. For example, one can use two values or four values, and still retain a really high image quality, while CSAA may need four or eight. Using two values instead of four values results in bandwidth reduction, which reduces the power usage in some embodiments.

This process of splitting involves splitting one or several values into more values. However, the total storage of all values is kept the same. The resolution of the values may decrease.

For example, assume in a red, green, blue, alpha value (RGBA) color space, that each value is stored using 8 bits per color component (R8G8B8A8). Instead of merging two values, one of the values could be split into two R4G4B4A4. This is likely not the best splitting procedure. However, if these two new values (using R4G4B4A4) cover very few visibility samples, then the corresponding values will get a low weight when the final pixel color is computed, and in those cases, this might be the best solution.

Alternatively, all values could split the cost. When the split results in fractional bits, then a larger integer number of bits can be used for some values and a lower integer number of bits may be used for other values. Advantageously the values with more bits may be used for values with the largest coverage.

This may be best explained with an example. Assume there are four values of R8G8B8A8 in the table for a pixel, and assume that all four values are occupied when a fifth value enters the pixel. Since there are 8*4 bits per component, those are split over five values, i.e., each component would get 8*4/5=32/5=6.4 bits. In one embodiment, let two values have R7G7B7A7 and the remaining three have R6G6B6A6. This sums to 32 bits, i.e., 7*2+6*3=14+18=32, so the cost is the same. The two values that have more bits may be reserved for the values that have the biggest coverage, so that the final reconstructed pixel color will get the best quality.

In another embodiment, the values that have the largest number of visibility samples keep their values at the original resolution (as long as is possible), and only the values that reference to one or a few visibility samples are split. When all colors have been split once, apply merging instead.

If there are $2^N$ values in a pixel, then each visibility sample usually needs N bits in order to reference to any of those $2^N$ values in the "palette" of the pixel. Now, all values may be to split at most once, then there are $2^{N+1}$ values, and hence, each pixel needs N+1 bits instead.

In another embodiment, standard 4×multi-sampling anti-aliasing (MSAA) is used to implement this scheme with only 2 values per pixel. With 4×MSAA, each pixel has 2 index bits in order to point to 4 different colors. If the number of original values is constrained to 2, and these two colors are split at most once, then 2 index bits per pixel are needed.

Using 16 visibility samples per pixel, then each of these 16 visibility samples needs 2 bits, which results in 16*2=32 bits per pixel, just for the index bits. Assuming R8G8B8A8, and two such values per pixel, the values need 32+32=64 bits, which results in 32*3=96 bits per pixel. Other configurations are possible.

Figure 3:
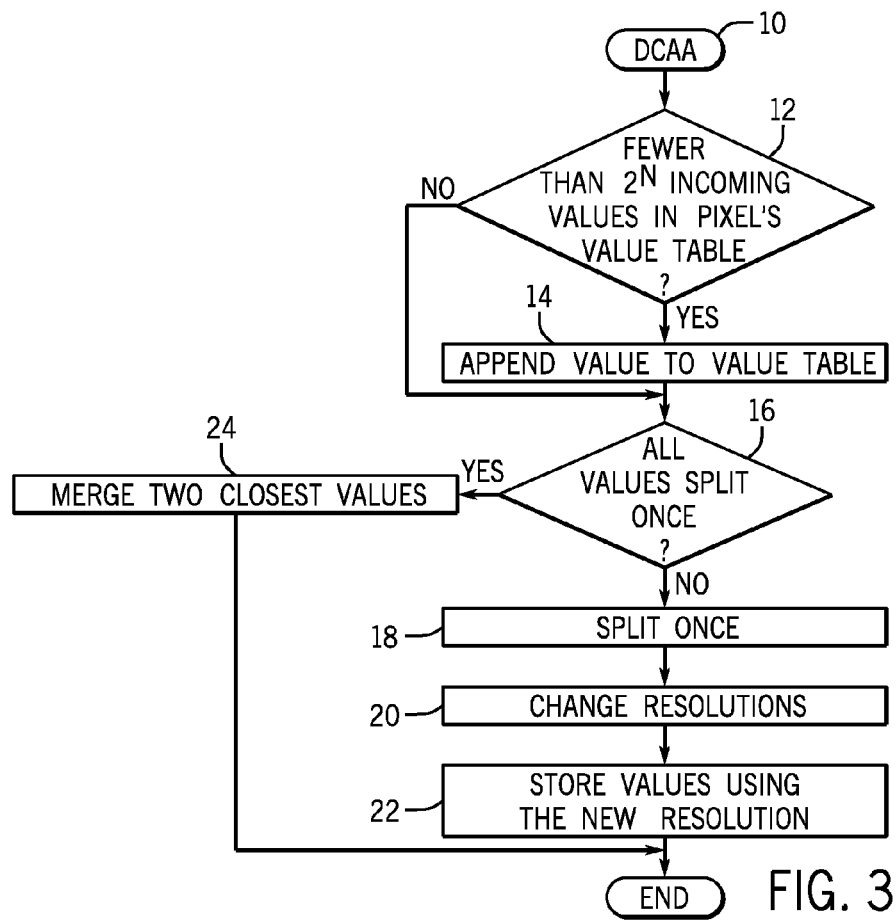
FIG. 3 is a flow chart for one embodiment.

The sequence 10 shown in FIG. 3 may be implemented in software, firmware and/or hardware. In software and firmware embodiments it may be implemented by computer executed instructions stored in one or more non-transitory computer readable media such as magnetic, optical or semiconductor storages. For example the sequence may be stored in a graphics processing unit or a central processing unit.

Assume there are $2^N$ values per pixel. For each incoming value to the pixels, the following steps are done in one embodiment. If fewer than $2^N$ values are used in the pixel's value table as determined at diamond 12, then append the value to the value table (block 14). Otherwise, all values already are occupied in the pixel's value table.

If not all values have been split once as determined in diamond 16, split once (block 18), and change the resolution of the relevant value (block 20), and store values using that resolution (block 22). Otherwise, if all values have been split once, merge the two closest values into one instead (block 24).

Clear (i.e. colorless) values can also be handled. Assume two bits per visibility sample to point into the value table. Other configurations are easily handled as well. If only one or two colors are being used by all the pixels in a tile, then only 00 and 01 are used for the index bits, since they will only point into value0 and value1. Hence, a value of 11 is not possible, and therefore, this index combination can be used to indicate that the current sample points to the clear value. All values in the entire tile need to use only one or two colors (and clear) for this to work.

Figure 4:
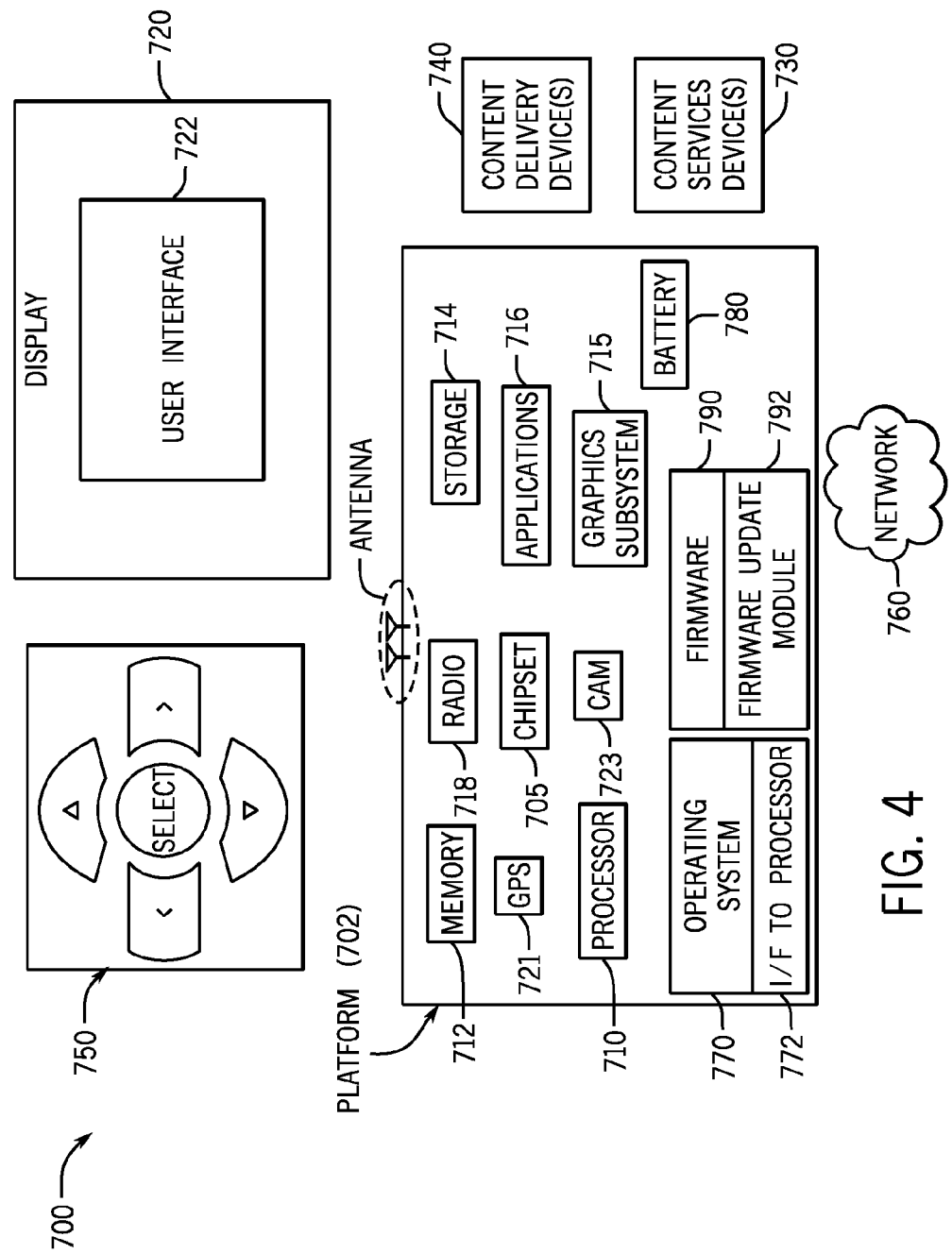
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
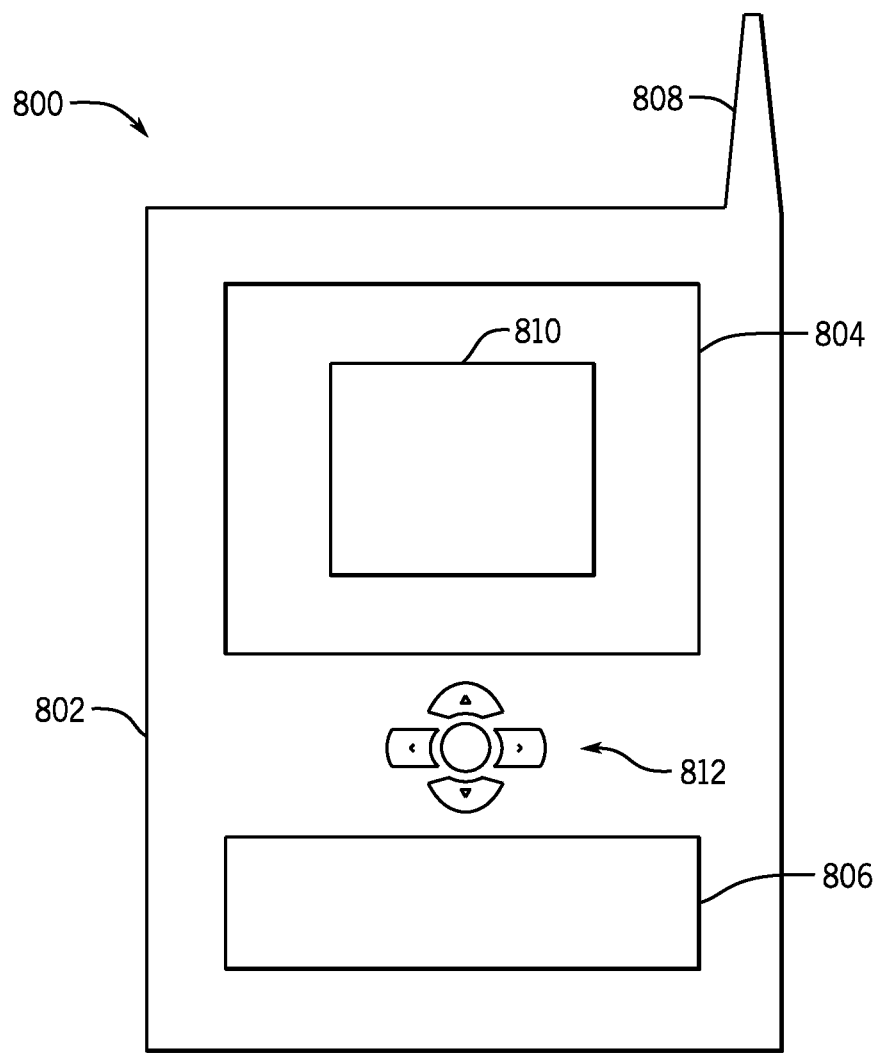
FIG. 5 is a front elevational view of one system.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising generating, using a processor, an antialiasing value table containing rendered values, representing each visibility sample as an index into the value table, and splitting an entry in said value table to hold more from one value. The method may include using one unique value table for each pixel. The method may include sharing one unique value table for each region of pixels. The method may include splitting an entry of a higher resolution into two lower resolution values. The method may include splitting more than one entry in the color table. The method may include splitting all N entries in the value table into N+1 lower resolution entries. The method may include providing more bits for some values than for other values. The method may include providing more bits for values with larger coverage and fewer bits for values with smaller coverage. The method may include only splitting values with fewer visibility samples than another value. The method may include using $2^N \times$ multi-sampling anti-aliasing with only $2^M$ values per pixel, where N>M. The method may include if less than a predetermined number of values are contained in a pixel's value table, appending a value to the value table. The method may include determining whether all values in a value table have been split once and if so, merging the two closest values into one value. The method may include changing the number of index bit combinations into the value table based on the number of colors that are used.

Another example embodiment may be one or more non-transitory computer readable media storing instructions to implement a sequence comprising generating an antialiasing value table containing rendered values, and representing each visibility sample as an index into the value table. The media may include said sequence may include using one unique value table for each pixel. The media may include said sequence including sharing one unique value table for each region of pixels. The media may include said sequence including splitting an entry of a higher resolution into two lower resolution values. The media may include said sequence including splitting more than one entry in the color table. The media may include said sequence including splitting all N entries in the value table into N+1 lower resolution entries. The media may include said sequence including using $2^N \times$ multi-sampling anti-aliasing with only $2^M$ values per pixel, where N>M. The media may include said sequence including if less than a predetermined number of values are contained in a pixel's value table, appending a value to the value table. The media may include said sequence including determining whether all values in a value table have been split once and if so, merging the two closest values into one value. The media may include said sequence including changing the number of index bit combinations into the value table based on the number of colors that are used.

In another example embodiment may be an apparatus comprising a a processor to generate an antialiasing value table containing rendered values, and represent each visibility sample as an index into the value table, and a storage coupled to said processor. The apparatus may include said processor to use one unique value table for each pixel. The apparatus may include said processor to share one unique value table for each region of pixels. The apparatus may include said processor to split an entry of a higher resolution into two lower resolution values. The apparatus may include said processor to determine whether all values in a value table have been split once and if so, merging the two closest values into one value. The apparatus may include a battery. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
generating, using a processor, an antialiasing value table containing rendered values;
representing each visibility sample as an index into the value table; and
improving image quality by splitting a value in said value table into more than one value to create more values per pixel.

2. The method of claim 1, including using one unique value table for each pixel.

3. The method of claim 1, including sharing one unique value table for each region of pixels.

4. The method of claim 1 including splitting an entry of a higher resolution into two lower resolution values.

5. The method of claim 4 including splitting more than one entry in the value table.

6. The method of claim 5 including providing more bits for some values than for other values.

7. The method of claim 6 including providing more bits for values with larger coverage and fewer bits for values with smaller coverage.

8. The method of claim 6 including only splitting values with fewer visibility samples than another value.

9. The method of claim 4 including splitting all N entries in the value table into N+1 lower resolution entries.

10. The method of claim 1 including using 2N×multi-sampling anti-aliasing with only 2M values per pixel, where N>M.

11. The method of claim 1 including if less than a predetermined number of values are contained in a pixel's value table, appending a value to the value table.

12. The method of claim 1 including determining whether all values in a value table have been split once and if so, merging the two closest values into one value.

13. The method of claim 1 including changing the number of index bit combinations into the value table based on the number of colors that are used.

14. One or more non-transitory computer readable media storing instructions to implement a sequence comprising:
   generating, using a processor, an antialiasing value table containing rendered values;
   representing each visibility sample as an index into the value table; and
   improving image quality by splitting a value in said value table into more than one value to create more values per pixel.

15. The media of claim 14, said sequence including using one unique value table for each pixel.

16. The media of claim 14, said sequence including sharing one unique value table for each region of pixels.

17. The media of claim 14, said sequence including splitting an entry of a higher resolution into two lower resolution values.

18. The media of claim 17, said sequence including splitting more than one entry in the value table.

19. The media of claim 17, said sequence including splitting all N entries in the value table into N+1 lower resolution entries.

20. The media of claim 14, said sequence including using 2N×multi-sampling anti-aliasing with only 2M values per pixel, where N>M.

21. The media of claim 14, said sequence including if less than a predetermined number of values are contained in a pixel's value table, appending a value to the value table.

22. The media of claim 14, said sequence including determining whether all values in a value table have been split once and if so, merging the two closest values into one value.

23. The media of claim 14, said sequence including changing the number of index bit combinations into the value table based on the number of colors that are used.

24. An apparatus comprising:
   a processor to generate, using a processor, an antialiasing value table containing rendered values, represent each visibility sample as an index into the value table, and improve image quality by splitting a value in said value table into more than one value to create more values per pixel; and
   a storage coupled to said processor.

25. The apparatus of claim 24, said processor to use one unique value table for each pixel.

26. The apparatus of claim 24, said processor to share one unique value table for each region of pixels.

27. The apparatus of claim 24, said processor to split an entry of a higher resolution into two lower resolution values.

28. The apparatus of claim 24, said processor to determine whether all values in a value table have been split once and if so, merging the two closest values into one value.

29. The apparatus of claim 24 including a battery.

30. The apparatus of claim 24 including firmware and a module to update said firmware.

* * * * *